(12) United States Patent
Cook

(10) Patent No.: US 8,996,354 B1
(45) Date of Patent: Mar. 31, 2015

(54) FACILITATING LOCALIZATION OF LINGUISTIC ASSETS OF A VIRTUAL SPACE

(75) Inventor: Dale Cook, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 323 days.

(21) Appl. No.: 13/609,117

(22) Filed: Sep. 10, 2012

(51) Int. Cl.
*G06F 17/28* (2006.01)
*A63F 13/00* (2014.01)

(52) U.S. Cl.
CPC *G06F 17/28* (2013.01); *A63F 13/00* (2013.01)
USPC ..................................... 704/3; 704/8; 463/32

(58) Field of Classification Search
CPC .............................. G06F 17/28; A63F 13/00
USPC ......... 704/2, 3, 4, 277; 463/32; 715/264, 703, 715/848
See application file for complete search history.

(56) References Cited

U.S. PATENT DOCUMENTS

| | | | | |
|---|---|---|---|---|
| 4,791,587 A | * | 12/1988 | Doi .................................. | 704/2 |
| 5,978,754 A | * | 11/1999 | Kumano ........................... | 704/3 |
| 6,061,701 A | * | 5/2000 | Hirai et al. ..................... | 715/236 |
| 6,219,646 B1 | * | 4/2001 | Cherny ......................... | 704/277 |
| 7,913,228 B2 | | 3/2011 | Ericsson et al. .............. | 717/123 |
| 7,930,167 B2 | * | 4/2011 | Young et al. ...................... | 704/8 |
| 8,499,307 B2 | * | 7/2013 | Resnick et al. ............... | 719/316 |
| 8,726,195 B2 | * | 5/2014 | Bill .............................. | 715/863 |
| 2005/0227768 A1 | | 10/2005 | Blackburn et al. .............. | 463/42 |
| 2007/0245321 A1 | | 10/2007 | Cosgrove et al. ............. | 717/136 |
| 2007/0288404 A1 | * | 12/2007 | Kacmarcik ..................... | 706/11 |
| 2008/0059570 A1 | * | 3/2008 | Bill .............................. | 709/203 |
| 2009/0111585 A1 | * | 4/2009 | Sakashita et al. ............... | 463/43 |
| 2009/0327002 A1 | | 12/2009 | Chapman et al. ................. | 705/7 |
| 2011/0077934 A1 | * | 3/2011 | Kanevsky et al. ................ | 704/3 |
| 2011/0282646 A1 | * | 11/2011 | Bill ................................ | 704/3 |
| 2012/0330646 A1 | * | 12/2012 | Andrade et al. .................. | 704/7 |
| 2013/0014033 A1 | * | 1/2013 | Hamick et al. ................ | 715/757 |
| 2013/0151604 A1 | * | 6/2013 | Ranade ........................ | 709/204 |
| 2013/0311528 A1 | * | 11/2013 | Liebermann .................. | 707/899 |
| 2014/0156257 A1 | * | 6/2014 | Jephcott ........................... | 704/2 |

FOREIGN PATENT DOCUMENTS

WO      WO 00/38052      *   6/2000

* cited by examiner

*Primary Examiner* — Martin Lerner
(74) *Attorney, Agent, or Firm* — Pillsbury Winthrop Shaw Pittman LLP

(57) ABSTRACT

Localization of linguistic assets of a virtual space may be facilitated. A first instance (associated with a first locale) and a second instance (associated with a second locale) of the virtual space may be implemented. The first locale may have first linguistic conventions, while the second locale may have second linguistic conventions. The first instance and the second instance may be provided for presentation to a human translator. Editing may be facilitated of a first linguistic asset of the first instance corresponding to a second linguistic asset of the second instance. The first linguistic asset or the second linguistic asset may be editable by the human translator such that the first linguistic asset conforms to one or more of the first linguistic conventions and the second linguistic asset conforms to one or more of the second linguistic conventions.

20 Claims, 3 Drawing Sheets

FACILITATING LOCALIZATION OF LINGUISTIC ASSETS OF A VIRTUAL SPACE

FIELD OF THE DISCLOSURE

This disclosure relates to facilitating localization of linguistic assets of a virtual space via a single interface configured to present and allow editing of linguistic assets of a first instance of the virtual space associated with a first locale and a second instance of the virtual space associated with a second locale.

BACKGROUND

Localization, in the context of virtual spaces, generally may refer to the preparation of a given virtual space for a specific locale. Localization of linguistic assets may relate to tailoring linguistic assets of a virtual space to linguistic conventions of a particular locale. Straight or literal natural language translation may often be insufficient or yield undesirable results. For example, the opening scene of the 1991 European Sega Mega Drive version of the video game Zero Wing by Toaplan was badly translated from the original Japanese version to "All your base are belong to us". Due to various factors such as, e.g., a translation having a different contextual meaning, a translation being of a different character length, and/or other factors, human translators performing straight translations may often require several iterations to arrive at a desirable result.

SUMMARY

One aspect of the disclosure relates to a system configured to facilitate localization of linguistic assets of a virtual space. Exemplary implementations may facilitate localization of linguistic assets of a virtual space via a single interface configured to present and allow editing of linguistic assets of a first instance of the virtual space associated with a first locale and a second instance of the virtual space associated with a second locale. As such, human translators may be able to immediately determine whether a given string means the wrong thing given the context, whether a given string is too long or too short for a specific virtual space design, or whether a given string otherwise appears awkwardly, and make appropriate changes.

In some implementations, the system may include one or more servers. The server(s) may be configured to execute one or more computer program modules including one or more of a space module, a translation interface module, an asset editing module, an asset database module, and/or other modules.

The space module may be configured to implement one or more instances of the virtual space. The space module may implement a given instance of the virtual space to determine views of the virtual space. Where the space module implements two or more instances of the virtual space, they may include a first instance and a second instance. The first instance may be associated with a first locale, while the second instance may be associated with a second locale. A given locale may include one or more of a country, a region, and/or other geographic locations or area. The first locale may have first linguistic conventions and the second locale may have second linguistic conventions. Linguistic conventions of a given locale may dictate acceptable manners for expressing ideas in the given locale. Generally speaking, linguistic conventions of a given locale may be based on one or more of a spoken language of the given locale, a dialect of the given locale, cultural references of the given locale, legal requirements of the given locale, and/or bases for linguistic conventions. At least one of the first linguistic conventions may be different from a corresponding one of the second linguistic conventions.

The translation interface module may be configured to provide the first instance and the second instance for presentation to a human translator. The translation interface module may be configured to provide a translation interface, as described further herein. The first instance and the second instance may be simultaneously viewable (e.g., side-by-side). The translation interface module may be configured to synchronously provide the first instance and the second instance such that a current view of the first instance corresponds to a current view of the second instance. The translation interface module may be configured to control and/or facilitate control of one or more view parameters of the first instance and the second instance. Controlling a given view parameter of the first instance may simultaneously and similarly affect the same view parameter of the second instance. Examples of view parameters may include one or more of a location in the virtual space (e.g., the location from which the view is taken, the location the view depicts, and/or other locations), a zoom ratio, a dimensionality of objects, a point-of-view, and/or view parameters.

The asset editing module may be configured to facilitate editing of linguistic assets of the two or more instances of the virtual space. Examples of linguistic assets may include one or more of in-space menus, in-space pop-up windows, in-space captions, dubbing scripts, subtitles, and/or other linguistic assets. Editing linguistic assets may include editing text. The linguistic assets may include a first linguistic asset associated with the first instance and a second linguistic asset associated with the second instance. The first linguistic asset may correspond to the second linguistic asset. That is, the first linguistic asset and the second linguistic asset may convey the same idea, refer to the same context, serve the same purpose, and/or otherwise correspond to each other. The first linguistic asset or the second linguistic asset may be editable by the human translator such that the first linguistic asset conforms to one or more of the first linguistic conventions and the second linguistic asset conforms to one or more of the second linguistic conventions.

The translation interface may be presented via the client computing platform(s) associated with a human translator and/or other users. The translation interface may include one or more of a first instance viewing field, a second instance viewing field, a first linguistic asset editing field, a second linguistic asset editing field, and/or other fields and/or information. The first instance viewing field may be configured to present views of the first instance of the virtual space. The second instance viewing field may be configured to present views of the second instance of the virtual space. The first linguistic asset editing field may be configured to facilitate editing of linguistic assets of the first instance of the virtual space. The second linguistic asset editing field may be configured to facilitate editing of linguistic assets of the second instance of the virtual space.

The asset database module may be configured to manage a linguistic asset database (not depicted). The linguistic asset database may be stored by server(s) and/or at another location. The linguistic asset database may be configured to store and/or provide access to one or more linguistic assets of the first instance and the second instance of the virtual space. In some implementations, the linguistic asset database may be configured to be accessible to one or both of a staging database (not depicted) or a production database (not depicted). The staging database and/or the production database may be stored by server(s) and/or at another location. The staging database may be associated with staging versions of the first instance and the second instance. The production database may be associated with production versions of the first instance and the second instance. Linguistic assets of the staging versions of the first instance and the second instance may be editable without affecting the production versions of the first instance and the second instance. In some implementations, one or more of the linguistic asset database, the staging database, and/or the production database may be combined as a single database.

In some implementations, when changes are made to linguistic assets (e.g., via the translation interface), the modified linguistic assets may be pushed to the staging database so that the staging versions of the virtual space are updated with the modified linguistic assets. Modified linguistic assets may be pushed to the production database responsive to approval by a producer (i.e., an individual who is responsive for overseeing production of the virtual space). Approval by the producer may be received via the translation interface and/or via other mechanisms.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
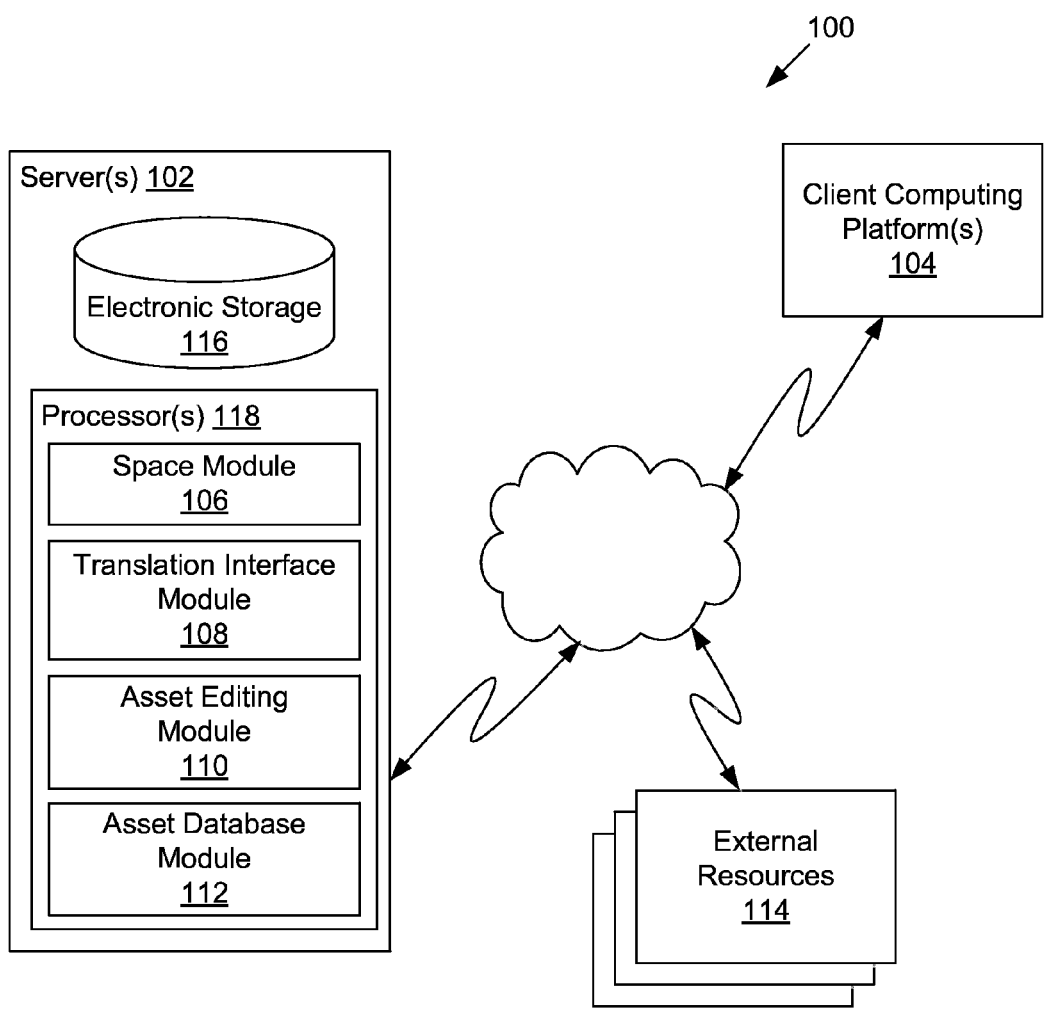
FIG. 1 illustrates a system configured to facilitate localization of linguistic assets of a virtual space, in accordance with one or more implementations.

FIG. 1 illustrates a system 100 configured to facilitate localization of linguistic assets of a virtual space, in accordance with one or more implementations. Exemplary implementations may facilitate localization of linguistic assets of a virtual space via a single interface configured to present and allow editing of linguistic assets of a first instance of the virtual space associated with a first locale and a second instance of the virtual space associated with a second locale. As such, human translators may be able to immediately determine whether a given string means the wrong thing given the context, whether a given string is too long or too short for a specific virtual space design, or whether a given string otherwise appears awkwardly, and make appropriate changes.

In some implementations, system 100 may include one or more servers 102. The server(s) 102 may be configured to communicate with one or more client computing platforms 104 according to a client/server architecture. Users may access system 100 and/or the virtual space via client computing platform(s) 104. Users of system 100 may include human translators and/or other users. A given human translator may have language skills sufficient to translate between at least two natural languages. The server(s) 102 may be configured to execute one or more computer program modules. The computer program modules may include one or more of a space module 106, a translation interface module 108, an asset editing module 110, an asset database module 112, and/or other modules.

The space module 106 may be configured to implement one or more instances of the virtual space. The space module 106 may implement a given instance of the virtual space to determine views of the virtual space. The views may then be communicated (e.g., via streaming, via object/position data, and/or other information) from server(s) 102 to client computing platform(s) 104 for presentation to users. The view(s) determined and transmitted to a given client computing platform 104 may correspond to a user character being controlled by a user via the given client computing platform 104. The view determined and transmitted to a given client computing platform 104 may correspond to one or more view parameters. Examples of view parameters may include one or more of a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance(s) of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 106 is not intended to be limiting. The space module 106 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 104. The users may interact with each other through communications exchanged within the virtual space. Such communications may include one or more of textual chat, instant messages, private messages, voice communications, and/or other communications. Communications may be received and entered by the users via their respective client computing platform(s) 104. Communications may be routed to and from the appropriate users through server(s) 102 (e.g., through space module 106).

Where the space module 106 implements two or more instances of the virtual space, they may include a first instance and a second instance. The first instance may be associated with a first locale, while the second instance may be associated with a second locale. A given locale may include one or more of a country, a region, and/or other geographic locations or area. The first locale may have first linguistic conventions and the second locale may have second linguistic conventions. Linguistic conventions of a given locale may dictate acceptable manners for expressing ideas in the given locale. Generally speaking, linguistic conventions of a given locale may be based on one or more of a spoken language of the given locale, a dialect of the given locale, cultural references of the given locale, legal requirements of the given locale, and/or bases for linguistic conventions. At least one of the first linguistic conventions may be different from a corresponding one of the second linguistic conventions.

The translation interface module 108 may be configured to provide the first instance and the second instance for presentation to a human translator. The translation interface module 108 may be configured to provide a translation interface. Exemplary implementations of a translation interface are described further in connection with FIG. 2. The first instance and the second instance may be simultaneously viewable (e.g., side-by-side). The translation interface module 108 may be configured to synchronously provide the first instance and the second instance such that a current view of the first instance corresponds to a current view of the second instance. The translation interface module 108 may be configured to control and/or facilitate control of one or more view parameters of the first instance and the second instance. Controlling a given view parameter of the first instance may simultaneously and similarly affect the same view parameter of the second instance. Examples of view parameters may include one or more of a location in the virtual space (e.g., the location from which the view is taken, the location the view depicts, and/or other locations), a zoom ratio, a dimensionality of objects, a point-of-view, and/or view parameters.

The asset editing module 110 may be configured to facilitate editing of linguistic assets of the two or more instances of the virtual space. Examples of linguistic assets may include one or more of in-space menus, in-space pop-up windows, in-space captions, dubbing scripts, subtitles, and/or other linguistic assets. Editing linguistic assets may include editing text. The linguistic assets may include a first linguistic asset associated with the first instance and a second linguistic asset associated with the second instance. The first linguistic asset may correspond to the second linguistic asset. That is, the first linguistic asset and the second linguistic asset may convey the same idea, refer to the same context, serve the same purpose, and/or otherwise correspond to each other. The first linguistic asset or the second linguistic asset may be editable by the human translator such that the first linguistic asset conforms to one or more of the first linguistic conventions and the second linguistic asset conforms to one or more of the second linguistic conventions.

Figure 2:
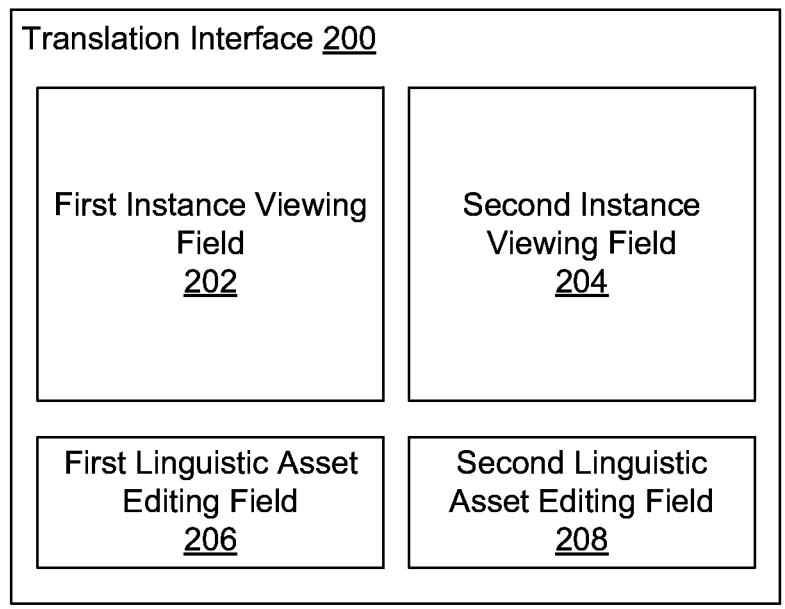
FIG. 2 illustrates a translation interface, in accordance with one or more implementations.

FIG. 2 illustrates a translation interface 200, in accordance with one or more implementations. The translation interface 200 may be presented via client computing platform(s) 104 associated with a human translator and/or other users. As depicted in FIG. 2, translation interface 200 may include one or more of a first instance viewing field 202, a second instance viewing field 204, a first linguistic asset editing field 206, a second linguistic asset editing field 208, and/or other fields and/or information. The depiction of translation interface 200 in FIG. 2 is not intended to be limiting as one or more of fields 202, 204, 206, and/or 208 may be omitted or combined with another field.

The first instance viewing field 202 may be configured to present views of the first instance of the virtual space. In some implementations, first instance viewing field 202 may be provided by or in conjunction with one or more of modules 106, 108, and/or 110.

The second instance viewing field 204 may be configured to present views of the second instance of the virtual space. In some implementations, second instance viewing field 204 may be provided by or in conjunction with one or more of modules 106, 108, and/or 110.

The first linguistic asset editing field 206 may be configured to facilitate editing of linguistic assets of the first instance of the virtual space. In some implementations, first linguistic asset editing field 206 may be provided by or in conjunction with one or more of modules 106, 108, and/or 110.

The second linguistic asset editing field 208 may be configured to facilitate editing of linguistic assets of the second instance of the virtual space. In some implementations, second linguistic asset editing field 208 may be provided by or in conjunction with one or more of modules 106, 108, and/or 110.

Referring again to FIG. 1, asset database module 112 may be configured to manage a linguistic asset database (not depicted). The linguistic asset database may be stored by server(s) and/or at another location. The linguistic asset database may be configured to store and/or provide access to one or more linguistic assets of the first instance and the second instance of the virtual space. In some implementations, the linguistic asset database may be configured to be accessible to one or both of a staging database (not depicted) or a production database (not depicted). The staging database and/or the production database may be stored by server(s) and/or at another location. The staging database may be associated with staging versions of the first instance and the second instance. The production database may be associated with production versions of the first instance and the second instance. Linguistic assets of the staging versions of the first instance and the second instance may be editable without affecting the production versions of the first instance and the second instance. In some implementations, one or more of the linguistic asset database, the staging database, and/or the production database may be combined as a single database.

In some implementations, when changes are made to linguistic assets (e.g., via the translation interface), the modified linguistic assets may be pushed to the staging database so that the staging versions of the virtual space are updated with the modified linguistic assets. Modified linguistic assets may be pushed to the production database responsive to approval by a producer (i.e., an individual who is responsive for overseeing production of the virtual space). Approval by the producer may be received via the translation interface and/or via other mechanisms.

In some implementations, server(s) 102, client computing platform(s) 104, and/or external resources 114 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 114 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 114, and/or provide other functionality attributed herein to client computing platform(s) 104. By way of non-limiting example, the given client computing platform xx may include one or more of a desktop computer, a laptop computer, a handheld computer, a NetBook, a Smartphone, a gaming console, and/or other computing platforms.

The external resources 114 may include sources of information, hosts and/or providers of virtual environments outside of system 100, external entities participating with system 100, and/or other resources. In some implementations, some or all of the functionality attributed herein to external resources 114 may be provided by resources included in system 100.

The server(s) 102 may include electronic storage 116, one or more processors 118, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may comprise electronic storage media that electronically stores information. The electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing platform(s) 104, and/or other information that enables server(s) 102 to function as described herein.

The processor(s) 118 may be configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units. These processing units may be physically located within the same device, or processor(s) 118 may represent processing functionality of a plurality of devices operating in coordination. The processor(s) 118 may be configured to execute modules 106, 108, 110, 112, and/or other modules. The processor(s) 118 may be configured to execute modules 106, 108, 110, 112, and/or other modules by software; hardware; firmware; some combination of software, hardware, and/or firmware; and/or other mechanisms for configuring processing capabilities on processor(s) 118.

It should be appreciated that although modules 106, 108, 110, and 112 are illustrated in FIG. 1 as being co-located within a single processing unit, in implementations in which processor(s) 118 includes multiple processing units, one or more of modules 106, 108, 110, and/or 112 may be located remotely from the other modules. The description of the functionality provided by the different modules 106, 108, 110, and/or 112 described herein is for illustrative purposes, and is not intended to be limiting, as any of modules 106, 108, 110, and/or 112 may provide more or less functionality than is described. For example, one or more of modules 106, 108, 110, and/or 112 may be eliminated, and some or all of its functionality may be provided by other ones of modules 106, 108, 110, and/or 112. As another example, processor(s) 118 may be configured to execute one or more additional modules that may perform some or all of the functionality attributed below to one of modules 106, 108, 110, and/or 112.

Figure 3:
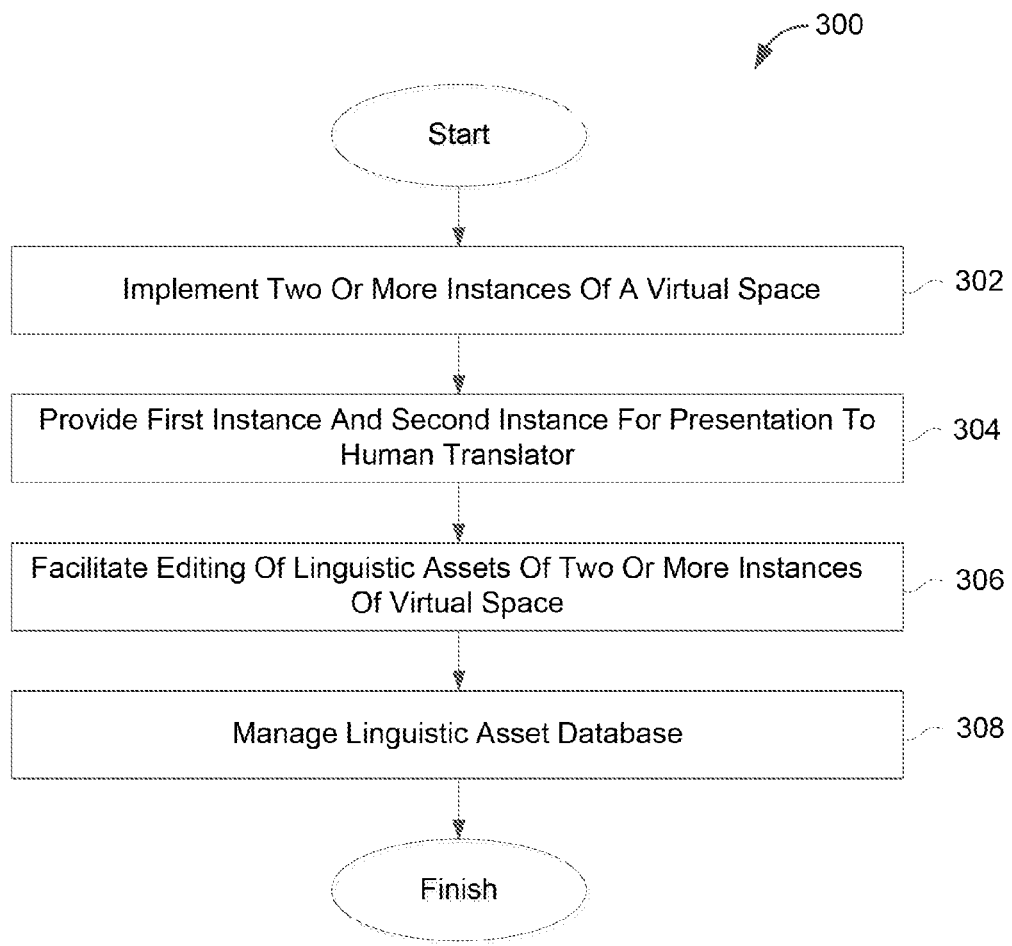
FIG. 3 illustrates a method for facilitating localization of linguistic assets of a virtual space, in accordance with one or more implementations.

FIG. 3 illustrates a method 300 for facilitating localization of linguistic assets of a virtual space, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, two or more instances of a virtual space may be implemented. The two or more instances may include a first instance and a second instance. The first instance may be associated with a first locale, while the second instance may be associated with a second locale. The first locale may have first linguistic conventions and the second locale may have second linguistic conventions. Operation 302 may be performed by a space module that is the same as or similar to space module 106, in accordance with one or more implementations.

At an operation 304, the first instance and the second instance may be provided for presentation to a human translator. Operation 304 may be performed by a translation interface module that is the same as or similar to translation interface module 108, in accordance with one or more implementations.

At an operation 306, editing may be facilitated of linguistic assets of the two or more instances of the virtual space. The linguistic assets may include a first linguistic asset associated with the first instance and a second linguistic asset associated with the second instance. The first linguistic asset may correspond to the second linguistic asset. The first linguistic asset or the second linguistic asset may be editable by the human translator such that the first linguistic asset conforms to one or more of the first linguistic conventions and the second linguistic asset conforms to one or more of the second linguistic conventions. Operation 306 may be performed by an asset editing module that is the same as or similar to asset editing module 110, in accordance with one or more implementations.

At an operation 308, a linguistic asset database may be managed. The linguistic asset database may be configured to store and/or provide access to one or more linguistic assets of the first instance and the second instance. Operation 308 may be performed by an asset database module that is the same as or similar to asset database module 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate localization of linguistic assets of a virtual space, the system comprising:
    one or more processors configured to execute computer program modules, the computer program modules comprising:
        a space module configured to implement a first instance of a staging virtual space associated with a first locale, and a second instance of the staging virtual space being associated with a second locale, the first locale having first linguistic conventions, the second locale having second linguistic conventions, wherein the staging virtual space includes objects positioned within the staging virtual space;
        a translation interface module configured to provide the first instance of the staging virtual space and the second instance of the staging virtual space for presentation to a human translator;
        an asset editing module configured to facilitate editing of linguistic assets of the instances of the staging virtual space, the linguistic assets including a first linguistic asset associated with the first instance of the staging virtual space and a second linguistic asset associated with the second instance of the staging virtual space, the first linguistic asset corresponding to the second linguistic asset, the first linguistic asset or the second linguistic asset being editable by the human translator such that the first linguistic asset conforms to one or more of the first linguistic conventions and the second linguistic asset conforms to one or more of the second linguistic conventions; and, wherein the space module is configured to:
        implement a first instance of a production virtual space being associated with a first locale and including the first linguistic asset, and a second instance of a production virtual space being associated with the second locale and including the second linguistic asset, wherein the production virtual space includes objects at corresponding locations to the objects in the staging virtual space, and wherein the production virtual space includes additional logic controls, for users, over the objects compared to the staging virtual space.

2. The system of claim 1, wherein the first linguistic conventions are based on one or more of a spoken language of the first locale, a dialect of the first locale, cultural references of the first locale, or legal requirements of the first locale; and wherein the second linguistic conventions are based on one or more of a spoken language of the second locale, a dialect of the second locale, cultural references of the second locale, or legal requirements of the second locale.

3. The system of claim 1, wherein at least one of the first linguistic conventions is different from a corresponding one of the second linguistic conventions.

4. The system of claim 1, wherein the translation interface module is configured to synchronously provide the first instance and the second instance such that a current view of the first instance corresponds to a current view of the second instance.

5. The system of claim 1, wherein the translation interface module is configured to control one or more view parameters of the first instance and the second instance, and wherein controlling a given view parameter of the first instance simultaneously affects the same view parameter of the second instance.

6. The system of claim 5, wherein the one or more view parameters include one or more of a location in the virtual space, a zoom ratio, a dimensionality of objects, or a point-of-view.

7. The system of claim 1, wherein the translation interface module is configured to provide a translation interface for presentation to the human translator, the translation interface including one or more of a first instance viewing field, a second instance viewing field, a first linguistic asset editing field, or a second linguistic asset editing field.

8. The system of claim 1, wherein the linguistic assets of the two or more instances of the virtual space include one or more of in-space menus, in-space pop-up windows, in-space captions, dubbing scripts, or subtitles.

9. The system of claim 1, further comprising an asset database module configured to manage a linguistic asset database, the linguistic asset database being configured to store and/or provide access to one or more linguistic assets of the first instance and the second instance.

10. The system of claim 9, wherein the linguistic asset database is configured to be accessible to one or both of a staging database or a production database, the staging database being associated with staging versions of the first instance and the second instance, the production database being associated with production versions of the first instance and the second instance, linguistic assets of the staging versions of the first instance and the second instance being editable without affecting the production versions of the first instance and the second instance.

11. A computer-implemented method for facilitating localization of linguistic assets of a virtual space, the method being performed by one or more processors configured to execute computer program modules, the method comprising:

implementing, using the one or more processors, a first instance of a staging virtual space associated with a first locale, and a second instance of the staging virtual space being associated with a second locale, the first locale having first linguistic conventions, the second locale having second linguistic conventions, wherein the staging virtual space includes objects positioned within the staging virtual space;

providing, using the one or more processors, the first instance of the staging virtual space and the second instance of the staging virtual space for presentation to a human translator;

facilitating, using the one or more processors, editing of linguistic assets of the instances of the staging virtual space, the linguistic assets including a first linguistic asset associated with the first instance of the staging virtual space and a second linguistic asset associated with the second instance of the staging virtual space, the first linguistic asset corresponding to the second linguistic asset, the first linguistic asset or the second linguistic asset being editable by the human translator such that the first linguistic asset conforms to one or more of the first linguistic conventions and the second linguistic asset conforms to one or more of the second linguistic conventions; and implementing, using the one or more processors, a first instance of a production virtual space being associated with a first locale and including the first linguistic asset, and a second instance of a production virtual space being associated with the second locale and including the second linguistic asset, wherein the production virtual space includes objects at corresponding locations to the objects in the staging virtual space, and wherein the production virtual space includes additional logic controls, for users, over the objects compared to the staging virtual space.

12. The method of claim 11, wherein the first linguistic conventions are based on one or more of a spoken language of the first locale, a dialect of the first locale, cultural references of the first locale, or legal requirements of the first locale; and wherein the second linguistic conventions are based on one or more of a spoken language of the second locale, a dialect of the second locale, cultural references of the second locale, or legal requirements of the second locale.

13. The method of claim 11, wherein at least one of the first linguistic conventions is different from a corresponding one of the second linguistic conventions.

14. The method of claim 11, wherein providing the first instance and the second instance for presentation to the human translator includes synchronously providing the first instance and the second instance such that a current view of the first instance corresponds to a current view of the second instance.

15. The method of claim 11, further comprising controlling, using the one or more processors, one or more view parameters of the first instance and the second instance, and wherein controlling a given view parameter of the first instance simultaneously affects the same view parameter of the second instance.

16. The method of claim 15, wherein the one or more view parameters include one or more of a location in the virtual space, a zoom ratio, a dimensionality of objects, or a point-of-view.

17. The method of claim 11, further comprising providing a translation interface for presentation to the human translator, the translation interface including one or more of a first instance viewing field, a second instance viewing field, a first linguistic asset editing field, or a second linguistic asset editing field.

18. The method of claim 11, wherein the linguistic assets of the two or more instances of the virtual space include one or more of in-space menus, in-space pop-up windows, in-space captions, dubbing scripts, or subtitles.

19. The method of claim 11, further comprising managing, using the one or more processors, a linguistic asset database, the linguistic asset database being configured to store and/or provide access to one or more linguistic assets of the first instance and the second instance.

20. The method of claim 19, wherein the linguistic asset database is configured to be accessible to one or both of a staging database or a production database, the staging database being associated with staging versions of the first instance and the second instance, the production database being associated with production versions of the first instance and the second instance, linguistic assets of the staging versions of the first instance and the second instance being editable without affecting the production versions of the first instance and the second instance.

* * * * *